Oct. 15, 1929.  E. M. BROGDEN  1,732,180
APPARATUS FOR PREPARING FRESH FRUIT FOR MARKET
Filed Feb. 23, 1926   4 Sheets-Sheet 1

Oct. 15, 1929.  E. M. BROGDEN  1,732,180
APPARATUS FOR PREPARING FRESH FRUIT FOR MARKET
Filed Feb. 23, 1926  4 Sheets-Sheet 4

Inventor
Ernest M. Brogden,
By Steward & McKay
his Attorneys

Patented Oct. 15, 1929

1,732,180

UNITED STATES PATENT OFFICE

ERNEST M. BROGDEN, OF SANTA MONICA, CALIFORNIA, ASSIGNOR TO BROGDEX COMPANY, OF WINTER HAVEN, FLORIDA, A CORPORATION OF FLORIDA

APPARATUS FOR PREPARING FRESH FRUIT FOR MARKET

Original application filed December 15, 1924, Serial No. 756,120. Divided and this application filed February 23, 1926. Serial No. 90,117.

This invention relates to apparatus for preparing fresh fruit for market; and it relates more particularly to apparatus suitable for use in carrying out fruit treating processes of the general type disclosed and claimed in my prior copending application, Serial No. 756,120, filed December 15, 1924, of which the present application is a division. Although, in the description to be given hereinafter, the use of the novel apparatus in carrying out the process set forth in said prior application will be referred to for convenience of explanation, it is to be understood that such use is only an example of how the apparatus may be used to advantage and that the apparatus is not limited to this particular use.

According to one embodiment of the novel process set forth in my prior application aforesaid, fruit is subjected to the action of a treating solution of requisite concentration for a period of time sufficient to ensure efficient and relatively permanent inhibiting action for protection of the fruit against development of the mold and other rot or decay-producing organisms which might otherwise attack it.

One of the objects of the present invention is to provide apparatus suitable for use in treating fruit according to the general method outlined above that will reduce the possibilities for mechanical injuries to the fruit to a minimum.

Still another object of the invention is to provide apparatus which may be operated to apply the treating solution to the fruit under moderate superatmospheric pressure.

A further object of the invention is to provide apparatus that will require a minimum of floor space and that will enable economy both in quantity of treating solution employed and in heat units.

Still another object is to provide apparatus of such character that the treating solution may be maintained reasonably uniform in composition throughout the treating system, and that the temperature of the treating solution may also be effectively controlled.

A further object of the invention is to provide apparatus such that silt and other foreign material may be removed from the main body of treating solution effectively and economically.

Other objects of the invention will appear more fully hereinafter in connection with the following description.

Apparatus typical of a practical embodiment of the invention is illustrated more or less diagrammatically in the accompanying drawings wherein Figs. 1 and 1ª, considered together and placed end to end, constitute a plan view of that part of the apparatus system employed in applying a mold-inhibiting solution to the fruit, parts of the apparatus being broken away or to some extent removed in order to show underlying parts;

Figs. 2 and 2ª, similarly taken together, are in general a vertical longitudinal section of the apparatus shown in Figs. 1 and 1ª;

Figure 2:
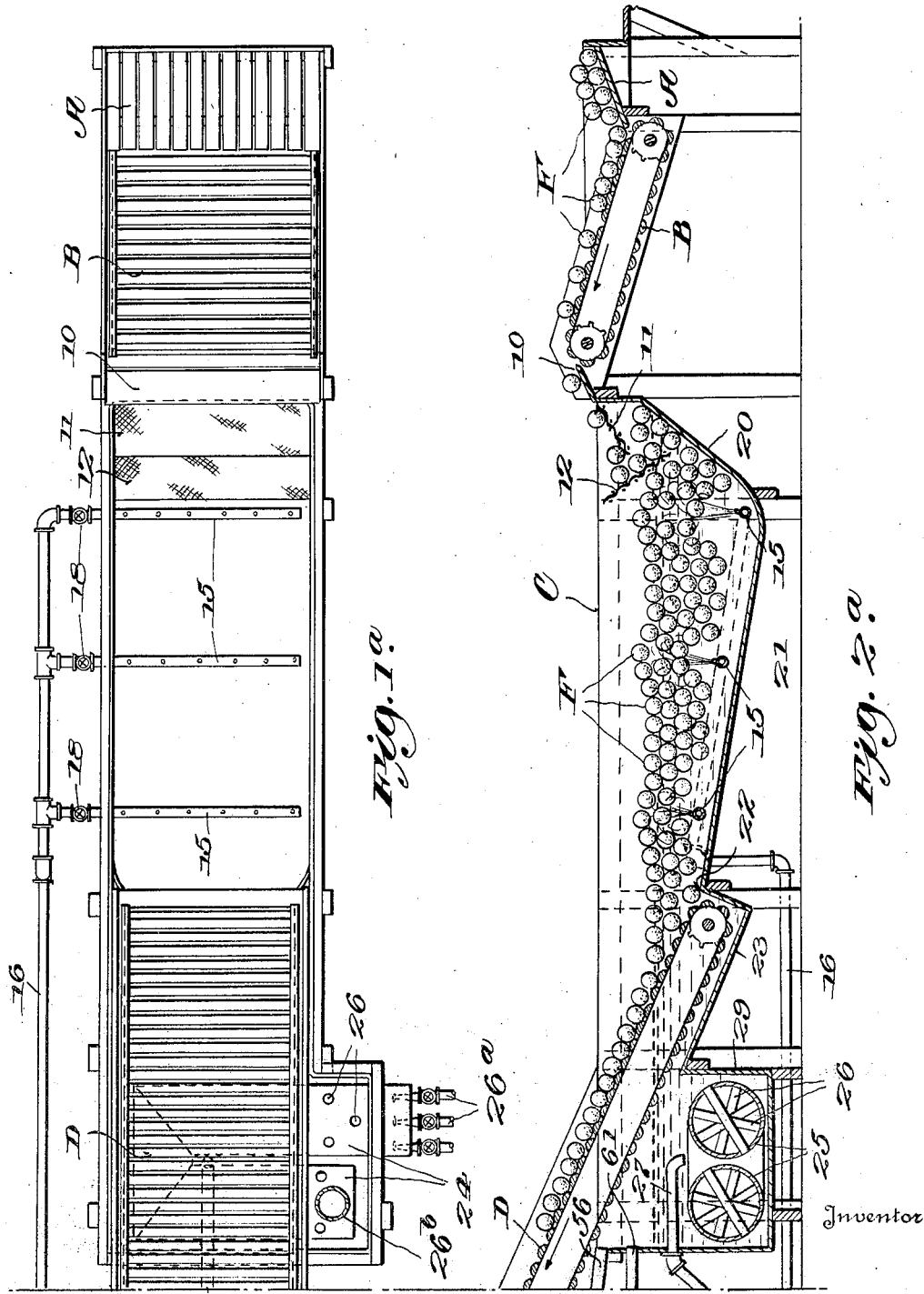
Figure 3:
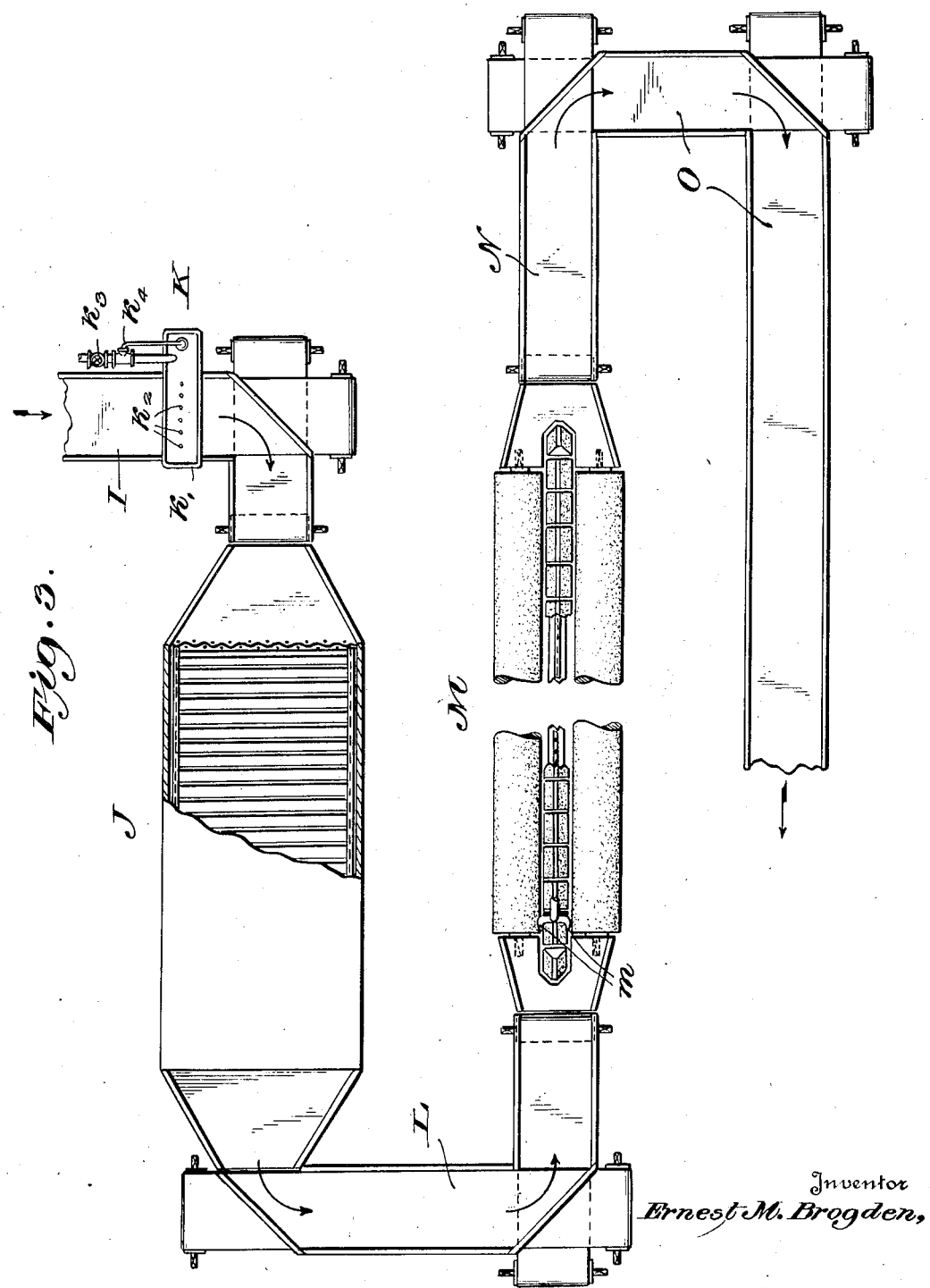
Fig. 3 is a plan view of apparatus for further handling the fruit after application of the mold-inhibiting solution thereto.
Figure 4:
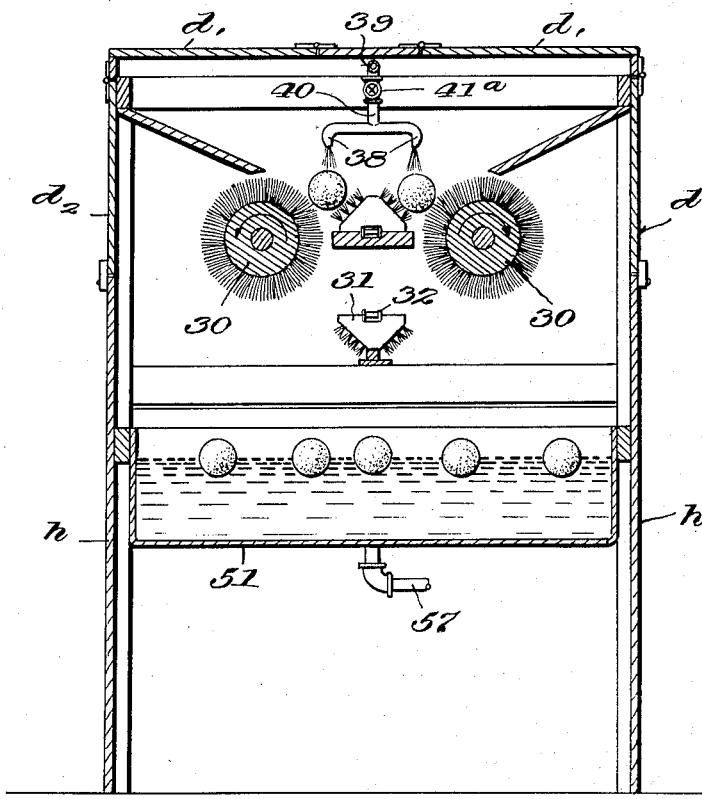
Fig. 4 is a cross-section on the line 4—4 of Fig. 1, illustrating constructional details of the washer device there shown.
Figure 5:
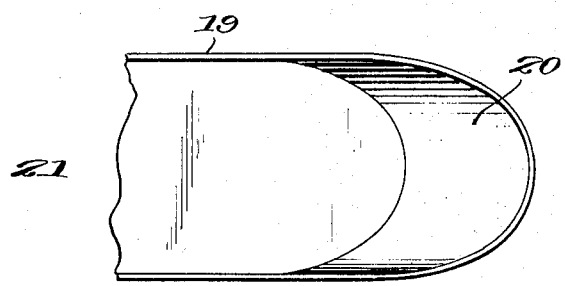
Fig. 5 is a fragmentary view, in plan, illustrating a desirable form for the receiving end of the soaking tank unit shown in Figs. 1ª and 2ª.

Referring to the drawings, A is a hopper into which fruit F, to be treated, is dumped. The elevator B conveys the fruit from said hopper and delivers it to a soaking tank indicated generally at C. Advancing toward the opposite end of this soaking tank, which contains a warm and suitable concentrated solution of a decay-inhibiting agent, borax for example, the fruit finally reaches the elevator D which conveys it up out of the tank and delivers it to the receiving end of a washer device E in which the fruit is given a thorough rubbing or scrubbing while further quantities of the warm treating solution are sprayed upon it. The fruit discharged from the lower or delivery end of the washer is lowered by means of a rotary transfer device T into a tank G extending underneath the full length of the washer. In this tank, which also contains warm borax solution, the fruit advances toward the right, as seen in Fig. 2, and is finally removed from the tank by the elevator H and discharged upon a conveyor belt I of ordinary type which conveys the fruit to a drier J. If desired, the fruit may be lightly rinsed before entering the drier by means of plain water, that is, water containing no treating reagent, sprinkled or showered upon the fruit in controlled quantity. A sprinkling device K may therefore be provided for this purpose. In the drier J, the surface moisture is removed from the fruit and, if desired, the fruit may then be graded, sized and packed in boxes in the usual manner without further treatment. However, where it is desired not only to treat the fruit for prevention of blue-mold or other preventable form of decay, but also to provide it with a film-like protective coating of waxy material that will hold it plump and firm, and thus prevent losses due to shrinkage and withering, the fruit upon leaving the drier is conveyed by belt L to a rotary brush device of the polisher type, indicated at M, where a minute quantity of an appropriate composition comprising waxy material, such as paraffin wax, and a light mineral oil solvent, is suitably applied to each fruit and thoroughly rubbed over the surface thereof by the action of the brushes. From the unit M, the fruit passes by way of belt conveyor N either directly to the graders and sizers or, as is usually better, to a unit O, which may be merely a conveyor belt, as shown, and the general function of which is to advance the fruit toward the graders and sizers but with such a predetermined period of delay as will enable more or less of the solvent contained in the wax composition to evaporate from the surface of the fruit. In some cases it is advantageous to further such evaporation by subjecting the fruit to currents of air, either heated or not, as it is advanced by the unit O; and in such a case the unit O may be a drier of any usual or suitable type, provided with means for directing air currents into contact with the slowly advancing fruit. From the unit O, the fruit passes next to the grading belt, sizers, and bins (not shown) for the final packing operations which may be of usual character.

It is to be understood, however, that the apparatus embodying this invention does not necessarily comprise all of the units mentioned in the foregoing general description.

Figure 1:
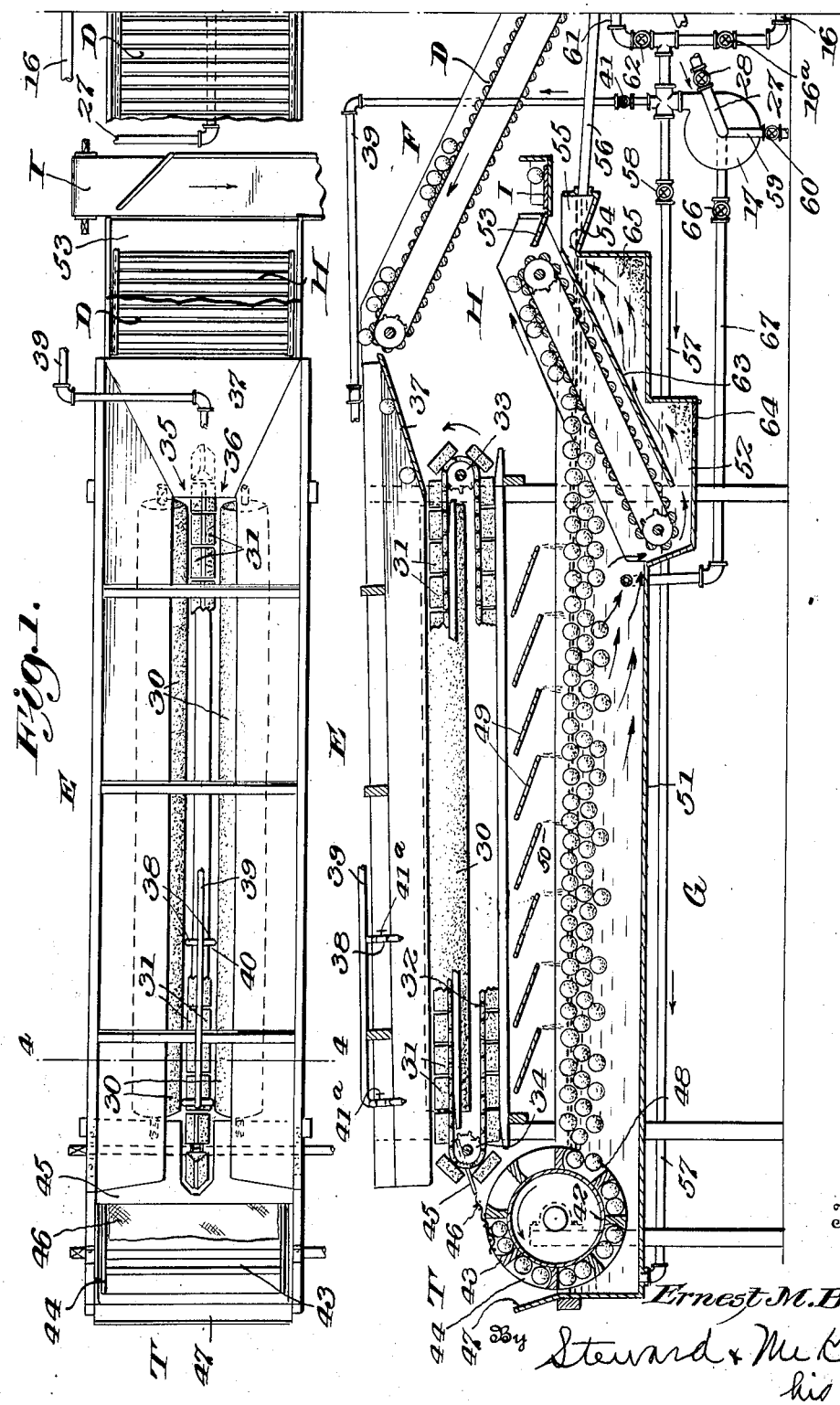

The general course of the fruit through the apparatus system being understood from the foregoing brief statement, the more important apparatus units comprised in the system will now be described in greater detail. The soaking tank C is desirably provided at its receiving end (toward the right in Figs. 1ª and 2ª) with means of some kind for breaking the fall of the fruit as it is delivered into the tank over the delivery or chute board 10 by the elevator B. In this particular instance such means comprise baffle members 11 and 12 most desirably composed of strips of flexible material such as canvas, stretched lightly across the entire width of the tank and suitably fastened by their ends in the staggered relation shown. Fruit delivered to the soaking tank falls first upon 11 and then upon 12, so that its momentum is checked and the danger of bruising is largely eliminated. Each fruit falling from baffle member 12 into the solutioan is pushed down below the surface thereof by the weight of the fruit that follows. The speed of each of elevators B and D is regulable and in operating the apparatus, the relative speeds of these elevators is intentionally so regulated as to cause the fruit to pile up at the receiving end of the tank and to force the under fruit well down below the surface of the treating solution. To promote this result, and at the same time to enable economy in volume of treating solution, the soaking tank may advantageously be relatively deep and narrow.

In order to facilitate piling up and submergence of the fruit, in starting, fruit is fed into the tank in the usual way, but none is removed until the fruit has piled up several layers deep.

Due to the correlation or control of the rate at which the fruit is fed to the soaking tank C and the rate at which the elevator D removes the fruit from the other end of the tank, fruit is held back and compelled to pile up in the tank several layers deep as indicated in the drawing, the fruit in the lowest layer being, say, as much as two to three feet or more below the surface of the liquid and being thus subjected to a corresponding hydrostatic pressure due to the head of liquid at that depth. This piling up of the fruit in the tank is more readily brought about and controlled if the slope or angle of rise of the elevator D is so steep that only single lines or rows of fruit can ride on the elevator slats, the fruit being unable to pile up on the elevator more than one row deep because of the action of gravity which causes the fruit above that resting directly on the elevator to roll back into the tank.

In order that the effect of the solution on the fruit going through the soaking tank may be more nearly uniform, means should most desirably be provided to agitate the fruit or move it about in such a way that the lower layers will exchange places with the upper layers from time to time, thus ensuring that all of the fruit undergoes submersion to a substantial depth in the treating solution for a considerable part of the time, ordinarily at least half the time, required for the fruit to travel through the soaking tank. This object can be accomplished in various ways, but in the present instance the effect is produced by means of strong jets of treating solution forced into the tank near the bottom by means of one or more properly apertured headers 15 extending transversely of the tank C near its bottom and supplied through pipe 16 from a pump 17 in a manner to be more fully hereinafter described. Between each of the headers 15 and the supply pipe 16 is located a gate valve 18 whereby any of the headers 15 may be cut off as conditions may require to give the best effect in advancing the fruit through the soaking tank. The agitating jets of fluid coming from the headers 15, when of proper strength and volume, are ample to maintain the treating solution in a state of substantial turbulence clear to the upper surface of the body of treating solution and thus to maintain the fruit in a circulating movement transverse to the general direction of advance and in more or less vertical eddies effective to constantly cause the fruit of the lower layers to move upwardly toward the surface, while the surface layers in turn sink downwardly to take its place. Moreover, each fruit is caused to turn over and over on different axes, thus ensuring its getting thoroughly wet all over even in cases where no effort is made to attain deep submergence and where the fruit may be merely floated through the tank at the surface of the liquid. The jet header nearest the receiving end of the tank may advantageously be arranged to direct its jets obliquely toward the far end of the tank thus facilitating initial movement of fruit toward that end. Often it is sufficient to use only one of the jet headers, the middle one of the three here shown, for example, to obtain satisfactory agitation.

As the elevator B feeds fruit into the soaking tank, and especially where the relative speeds of the elevators B and D are so regulated as to favor the piling up effect in the soaking tank as already described, there is a tendency for the fruit to advance more rapidly through the central portion of the tank than it does at the sides. In order to remedy this, and to cause all the fruit to move through the tank at about the same rate, it is of considerable advantage to construct the receiving end of the soaking tank C in the form most clearly illustrated in Figs. 2ª and 5. As here shown, the receiving end of the tank is rounded in such a way as to resemble the curved end of a bath tub, the side and end walls, indicated at 19 and 20, respectively, being curved forwardly and downwardly toward the tank bottom 21. This construction has the effect of causing the fruit as it is dumped into the tank to advance away from the receiving end as rapidly at the sides as it does in the middle, thus ensuring substantially uniform travel of all the fruit toward the other end of the tank. Furthermore, the elevator D should be of substantially the same effective width as the tank so that it removes fruit from the tank over the entire width thereof.

In the particular embodiment of apparatus here illustrated, the bottom of the soaking tank C slopes gently upward to the point 22 where there is a downward jog providing a recess or pocket 23 for the foot of the elevator D. This upward slope of the tank bottom 21 not only aids in the general plan of holding the fruit back in the soaking tank and causing it to pile up in layers as shown, while at the same time favoring uniformity of feed to the elevator, but it further serves to enable operation with a considerably smaller volume of treating solution than would be required if a tank of uniform depth were used. It also tends to prevent undissolved lumps of reagent from being carried under the foot of the elevator. Sloping the bottom of the recess 23 in the manner shown has the advantage of minimizing dead or inactive space in which the solution may become pocketed and thus escape effective circulation.

Beyond the recess or pocket 23 and under the elevator D is a compartment forming a part of the tank construction and serving as a chamber, more or less distinct from the soaking tank proper, wherein the treating solution can be heated to the desired operating temperature. This compartment contains heating means of any suitable character, which in this instance takes the form of a gas heater 24 of well known type consisting in general of a U-shaped cylindrical shell 25, through which extend transverse water tubes or passages 26, the heater being fired by one or more suitable gas burners 26ª discharging flame and hot gases into the intertubular spaces within the shell 25, the waste gases leaving through stack 26ᵇ. The pump 17 has its intake connected to the heating chamber by pipe 27, which is valved at 28 and opens into the heating compartment at a point somewhat above the heater 24. The pump can therefore withdraw warm treating solution from the heating compartment through pipe 27 and discharge it through pipe 16 and headers 15 into the soaking tank proper, the solution constantly flowing back over the upper edge of the compartment wall 29 into proximity with the heater, and continuous circulation being thus maintained. In practice it is desirable that the heating means be of sufficient capacity to heat the solution in the heating compartment to a temperature such that it will be at from 110° to 120° F. in the soaking tank proper, 115° F. being good average practice when employing borax solution.

The fruit having received a thorough soaking in the tank C, the elevator D carries it up to the receiving end of the washer E. This washer may be of any construction suitable for the purposes in view, but that here illustrated is of a type deemed particularly advantageous because of its efficient action in thoroughly rubbing the entire surface of the fruit, including the stem end, which is difficult to accomplish in practice. This washer comprises two rotary brush rolls 30 of Tampico fiber or horsehair arranged in parallel and cooperating with a series of brush elements 31 of triangular cross-section carried upon an endless chain 32 trained around sprockets 33—34, one of which is driven to carry the upper run of the endless chain of brushing elements thus formed between and longitudinally of the two rotary brush rolls 30, thereby providing two fruit runways indicated generally at 35 and 36 into which the fruit discharged by the elevator D upon the chute board 37 enters and passes toward the discharge end of the washer. In the present instance, brush rolls 30 are shown as sloping downward gently from the receiving end of the washer, but they may be arranged to slope in the opposite direction or with no slope at all.

A plurality of overhead jets or taps may be provided for drenching the fruit with warm treating solution as it passes down the runways 35, 36. These may be arranged at spaced intervals a short distance above each of said fruit runways. These taps, indicated at 38, are supplied with solution from the pump 17 through main supply pipe 39 and branches 40, the supply pipe 39 being valved at 41, as shown, and each of the branches being valved at $41^a$, thus permitting ready adjustment of the amount of solution sprayed upon the fruit. This arrangement for thoroughly rubbing the fruit while wet with the warm treating solution, and especially after the preliminary soaking in the tank C, provides very effective means for ensuring intimate contact of the treating solution with all portions of the exterior of the fruit. Minute bubbles of air trapped in tiny surfaces crevices and recesses in the rind of the fruit, which prevent actual contact of the treating solution with those portions of the rind, can thus be dislodged and the surfaces of these crevices and recesses thoroughly wetted with the treating solution and rendered mold-resistant, something which is important to ensure dependable inhibiting action of the treating solution. In order to minimize heat losses, due to spraying warm solution on fruit going through the washer, the washer may be enclosed in a housing $h$ having hinged top and side doors $d_1$, $d_2$, which may be opened for inspection or repair of the apparatus. Likewise the soaking tank C may be covered, and the elevators, as well as transfer device T, may be enclosed in appropriate housings which are omitted from the present drawings, however, to avoid complicating them. Furthermore, the various tanks and housings may be encased in heat-insulating material, if desired.

After the fruit has been treated in the washer E, it is desirable, although not always essential, that the fruit remain wet with the treating solution for a further substantial period of time in order to ensure the requisite complete action of the treating solution. At the same time, it is desirable to maintain the steady advance of the traveling stream of fruit through the series of packing house operations. In order to attain these ends, while avoiding mechanical injury to the fruit, appropriate means are provided for the purpose. In the form of the invention here illustrated, such means comprise the tank G containing warm borax solution, into which the fruit after leaving the washer is transferred and through which it is advanced gently. In order to transfer the fruit from the delivery end of the washer E down into the tank G below without bumping or otherwise injuring the fruit a suitable transfer device is used which in this instance takes the form of a rotary transfer member T whose general construction resembles that of a paddle wheel. In this construction, the central drum 42 carries blades 43 extending radially therefrom; while the circular pieces 44 carried on the opposite faces of the drum form end walls for the receptacles or pockets, one of which is formed between each successive pair of adjacent blades 43. As the device rotates in the direction indicated by the arrow, the fruit discharged from the delivery end of the washer over chute board 45 drops into the pockets or compartments of the transfer device and is carried down into the body of treating solution contained in the tank G beneath the washer, all the fruit being thereby again submerged well below the surface of the solution. If desired, and especially in handling very sensitive fruit such as lemons, a flexible member 46 of canvas or the like may be fastened to and extend beyond the chute board 45 in such manner as to cushion the drop of the fruit into the pockets of the rotary transfer device, but as this drop is slight it is often unnecessary with less sensitive fruit to employ member 46. In order that the fruit may be held in the pockets of the transfer device practically until it has been lowered to the level of the liquid in tank G, the carrying faces of the blades 43 may be concave as shown. The upwardly extending guard member 47 at the end of the tank G prevents the possibility of an occasional fruit being discharged over the rear edge of the tank. The operation of the wheel device T tends to advance the fruit through the tank G, each blade 43 gently pushing forward the fruit that rested on the preceding blade, as indicated for example at 48. The fruit is thus advanced slowly but systematically through the body of warm treating solution toward the opposite end of the tank. The layer of fruit at the surface of the liquid is constantly showered with the excess treating solution falling from the washer E above; and in order to render this showering more uniform and systematic, sloping distributing members 49 may be disposed below the washer and extending transversely thereof, as shown, to receive the drip from the washer and distribute it in the form of spaced transversely extending sheets of drip or spray, indicated at 50. Such distributing means are of course not essential but offer practical advantages in some cases.

The bottom 51 of the tank G may slope gently downward toward the foot of elevator H and the transversely extending recess or well 52 into which said foot extends, or said bottom may slope upward toward the foot of the elevator, as in tank C. Each arrangement has certain advantages, but the last mentioned construction is preferable if it is desired to maintain maximum submergence of the fruit in tank G with a minimum amount of treating solution. As in the case of elevator D, the angle of rise of elevator H is most desirably also such that the fruit can lie on the carrying slats only one layer deep, piling up of the fruit more than one layer deep being substantially prevented by gravity. Therefore, by properly correlating the speed of the rotary transfer device T and the elevator H when the apparatus is first placed in operation, the fruit can be held back and made to accumulate in the tank G to a depth of several layers, which is desirable, and thereafter the elevator H can be operated at a speed just sufficient to remove the fruit from tank G as rapidly as it is delivered thereto by the transfer device T, thus maintaining the fruit several layers deep in the tank.

The fruit carried out of the tank by the elevator H is discharged over chute board 53 to the conveyor belt I, as previously described. While on this belt the fruit travels under fresh water sprinkler K, already referred to, where it may be showered with a carefully regulated amount of plain cool water sufficient in quantity to rinse from the surface of the fruit such excess of treating reagent, borax in this instance, as to prevent objectionable crystalline formation on the roller conveyor elements of the drier J, and also to avoid objectionable visible deposit of such reagent on the fruit after it has been dried; without, however, removing so much of the treating reagent as would again render the fruit subject to ready attack and destruction by blue mold or other rot organisms. It is to be understood also that while this rinsing, if properly carried out and carefully controlled, is of advantage from a commercial standpoint in satisfying fruit buyers as to the appearance of the fruit, the employment of rinsing means is not essential in the broader aspects of the invention and is to be regarded as a refinement that can be dispensed with without departing from the spirit of the invention in its broader aspects. Where rinsing is resorted to, the sprinkler K may take the form of a small tank $k_1$ having a row of apertures $k_2$ in its bottom extending transversely of and a short distance above the belt I. Fresh water may be supplied to the tank through pipe $k_3$ and a constant head or level of water maintained in the tank by means of float-controlled valve $k_4$. The amount of water with which the fruit is rinsed as it passes under the sprinkler will depend upon the size of the apertures $k_2$, the head of water in the sprinkler tank, and the linear speed of the conveyor belt I. Any one or all of these factors can be adjusted to arrive at just the amount of rinsing required to achieve the objects above outlined. In a typical instance, where the speed of the conveyor belt I was about 100 feet per minute, it was found satisfactory to have the apertures $k_2$ about 5/64 inch in diameter and spaced about 3/8 inch apart in the row, while a head of 4½ inches of water was maintained in the tank $k_1$. In this connection, it may be stated that where rinsing is employed, it is advantageous as a rule to have previously maintained the fruit thoroughly wet with the treating solution for eight or ten minutes at least, thus allowing sufficient time for the warm solution to penetrate into the rind or into the minute surface crevices thereof and into exposed tissues to such an extent that the subsequent rinsing with plain water does not materially lower the resistance of the fruit to blue mold or the like.

The remaining steps in the handling of the fruit, whether it be provided with a waxy protective coating or not, have already been briefly described hereinabove, and for the purposes of the present invention require no extensive detailed explanation. It may be stated, however, that the construction of the unit M is in general similar to that of the washer unit E, the rotary brush rolls of the unit M usually having soft surfaces of horsehair bristles. The small quantity of the paraffin-solvent mixture necessary to apply to the fruit to obtain the desired protective waxy coating may be sprayed or atomized upon the fruit as it travels down the runways of the unit M by means of air brushes or similar spray devices $m$, one of which is mounted above each runway near the receiving end of the unit M, as shown.

In the usual operation of the system shown in the drawings, the working level of the liquid in the tank G always remains constant, irrespective of the quantity of the fruit passing through the tank. This constant level is fixed by the overflow weir 54, the excess solution discharging over this weir into a launder 55 and returning by way of a drain 56 to the soaking tank, as shown, the upper edge of the soaking tank being disposed slightly below the liquid level in tank G in the particular installation here illustrated. The liquid level in the soaking tank C, on the other hand, may fluctuate considerably, but should always be somewhat above the upper edge of partition 29 in order that there may be free flow of liquid between the heating compartment and the soaking tank proper.

To provide for additional and more rapid circulation of the treating solution through the tank G, the discharge side of the pump 17 may be connected to line 57, valved at 58 to the remote end of the tank G, as shown. By supplying treating solution to the tank G through this pipe 57, temperature differences between the solution in tank G and in the soaking tank C may be minimized. The pump intake may also be connected by pipe 59, valved at 60, to a fresh water supply line, so that make-up water may be introduced into any part of the tank system, together with fresh additions of borax, as may be required to maintain the proper quantity and proper concentration of the treating solution. The solution may of course be made up outside in a separate mixing tank and introduced into the tank system here illustrated; but in practice it is found most convenient simply to add from time to time the necessary quantity of borax in solid form to the tank C and to introduce the fresh make-up water into the heating compartment through supply pipe 61 valved at 62. The necessary amount of make-up water having been introduced, the valve 62 may be closed and valve 16ª opened, whereupon the jets 15 are operated and function not only to keep the fruit moving in vertical eddies, as described, but also to aid in rapidly dissolving the added borax or other treating reagent.

In order to further systematize the circulation of treating solution, and for other purposes which will presently appear, flow obstructing means such as a baffle plate 63 may be arranged under the elevator H in tank G, extending from a point above the liquid level in said tank to a point near the foot of said elevator but somewhat above the bottom of the recess or well 52. This baffle plate 63 extends across the entire width of the tank and may fit closely against the opposite sides of said tank. In order to escape over the weir 54, therefore, the treating solution is obliged to travel down around the foot of the elevator and under the baffle plate, following the general course indicated by the arrows. At the locations 64 and 65, the channel for the flow of solution is of ample width and the velocity of the solution is accordingly relatively slow. Opportunity is therefore given in these localities for suspended matter to settle out as indicated. At the end of a day's run, or whenever it is desired to clean out the tank G, the valve 66 in suction pipe 67, which is connected to the pump intake, can be opened, valve 28 opened, and valves 41 and 58 closed. Under these conditions the pump operates to withdraw all but a small part of the solution from the tank G and to discharge it into the heating compartment of the tank C. This having been accomplished, the solution remaining in tank G can be run to waste and the dirt and settlings that have accumulated at 64 and 65 can be flushed out through suitable clean-out openings (not shown).

In practical operation it is usually desirable to withdraw the treating solution from tank G and run it into tank C as described, in order that, before starting the next day's run, the solution as a whole may be heated up to the proper temperature and the tank G quickly filled with the warm solution, and the sprays 38 also supplied with the same, for proper treatment of the first fruit that is run through. On this account the tank C is most desirably of ample capacity to contain all the treating solution that is to be used in the entire system at any time.

It is to be understood that various changes in the apparatus above described may be made without departing from the broad scope of the invention.

Although the greatest present utility of the novel apparatus is for treating fresh fruits such as oranges, grapefruit, tangerines, lemons and other citrus fruits, the invention extends to the treatment of vegetables and the term "fruit" as used herein includes broadly fruits, vegetables, and the like.

What is claimed is:

1. Apparatus for treating fruit and the like comprising, in combination, a tank adapted to contain a treating solution, means located near the receiving end of the tank for submerging fruit in said solution, and means operable to retard progress of fruit through the tank and to compel it to pile up several layers deep in said solution.

2. Apparatus for treating fruit and the like comprising, in combination, a tank adapted to contain a treating solution, means located near the receiving end of the tank for submerging fruit in said solution and for advancing fruit therethrough, and means operable to retard progress of fruit through the tank and to compel it to pile up several layers deep in said solution.

3. Apparatus for treating fruit and the like comprising, in combination, a tank adapted to contain a treating solution, means for feeding fruit into said treating solution at one locality, such feeding means submerging the fruit, and means for removing fruit from said solution at another locality, such removing means being operable in conjunction with said feeding means to hold fruit back in the tank and compel it to pile up several layers deep in the solution.

4. Apparatus for treating fruit and the like comprising, in combination, a tank adapted to contain a treating solution, paddle wheel means operable to submerge fruit in the solution temporarily and then to release it, and means adapted to control the speed of movement of fruit through the tank, whereby the freely floating fruit may be compelled to pile up several layers deep in the solution.

5. Apparatus for treating fruit and the like which comprises, in combination, a fruit washer, a tank, and means adapted and arranged to receive articles discharged from said washer, to transfer them to said tank, and to force then below the surface of liquid therein.

6. Apparatus for treating fruit and the like which comprises, in combination, a rotary brush fruit washer, liquid-dispensing means associated therewith, a tank arranged therebelow, means for transferring articles from the discharge of said washer to said tank, and means for directing into said tank liquid descending from said washer.

7. Apparatus for treating fruit and the like comprising, in combination, a tank, and an elevator device for removing articles therefrom, the bottom of said tank being sloped upwardly to a point adjacent said elevator.

8. Apparatus for treating fruit and the like comprising, in combination, a soaking tank, a treating tank adjacent thereto, a fruit washer for treating and exposing the surface of the fruit to the treating agent, means for conducting fruit from said soaking tank to said washer, means for conducting fruit from said washer into said treating tank, solution-heating means, and means for circulating solution in contact with said heating means and through said tanks and to said washer.

9. In a fruit-handling apparatus and in combination with conveying means for effecting the travel of the fruit therethrough, a flowing liquid stream adapted to receive the fruit and deliver it upon the conveying means, said stream carrying a cleansing component.

10. In a fruit handling apparatus fitted with treating elements of washing and drying nature, and in combination with conveying means for effecting the travel of the fruit through said elements, a flowing liquid stream adapted to receive the fruit and deliver it upon the conveying means, said stream carrying a cleansing component.

11. The method of handling fruit for shipment comprising depositing and advancing the fruit in and by a flowing liquid stream of a disinfecting nature, and then continuing its advance apart from said stream through a washing zone.

12. The method of handling fruit for shipment comprising depositing and advancing the fruit in and by a flowing liquid stream containing a disinfecting component, and then continuing its advance, apart from said stream, successively through a zone of washing liquid, and a drying zone.

13. The method of handling fruit for shipment comprising depositing and advancing the fruit in and by a flowing liquid stream of a disinfecting nature, and then continuing its advance apart from said stream through a drying zone.

In testimony whereof I hereunto affix my signature.

ERNEST M. BROGDEN.